(12) United States Patent
Schmidt et al.

(10) Patent No.: US 8,834,764 B2
(45) Date of Patent: Sep. 16, 2014

(54) METHOD AND APPARATUS FOR DRYING AN EXTRUDED MATERIAL

(75) Inventors: Siegfried Schmidt, Verden-eitze (DE); Johannes P. Schlebusch, Thedinghausen (DE)

(73) Assignee: Mars, Inc., McLean, VA (US)

( * ) Notice: Subject to any disclaimer, the term of this patent is extended or adjusted under 35 U.S.C. 154(b) by 513 days.

(21) Appl. No.: 12/671,636

(22) PCT Filed: Aug. 5, 2008

(86) PCT No.: PCT/EP2008/006429
§ 371 (c)(1),
(2), (4) Date: Mar. 16, 2010

(87) PCT Pub. No.: WO2009/018997
PCT Pub. Date: Feb. 12, 2009

(65) Prior Publication Data
US 2011/0210463 A1 Sep. 1, 2011

(30) Foreign Application Priority Data

Aug. 7, 2007 (DE) .......................... 10 2007 037 607

(51) Int. Cl.
| | | |
|---|---|---|
| B29C 47/88 | (2006.01) |
| A23L 1/015 | (2006.01) |
| A23P 1/12 | (2006.01) |
| F26B 17/04 | (2006.01) |
| F26B 21/06 | (2006.01) |
| A23L 3/40 | (2006.01) |

(52) U.S. Cl.
CPC ............... *A23P 1/12* (2013.01); *A23L 1/0151* (2013.01); *F26B 17/04* (2013.01); *F26B 21/06* (2013.01); *A23L 3/40* (2013.01)
USPC ...................................... 264/211.13

(58) Field of Classification Search
USPC ...................................... 264/211.13
See application file for complete search history.

(56) References Cited

U.S. PATENT DOCUMENTS

| 3,348,599 | A | | 10/1967 | Lohstoeter et al. |
| 4,104,958 | A | | 8/1978 | Manser et al. |
| 4,413,971 | A | * | 11/1983 | Nettleton ...................... 425/311 |
| 4,539,214 | A | | 9/1985 | Winter et al. |
| 5,153,017 | A | | 10/1992 | Schaaf |
| 5,505,567 | A | * | 4/1996 | Scott ............................ 406/106 |
| 5,711,086 | A | | 1/1998 | Stubbing |
| 5,915,815 | A | * | 6/1999 | Moore et al. .................... 34/305 |

FOREIGN PATENT DOCUMENTS

| DE | 3711840 A1 | 10/1988 |
| DE | 3818422 A1 | 12/1989 |
| FR | 2607230 A1 | 5/1988 |
| WO | WO-02/40386 A1 | 5/2002 |
| WO | WO-2009/018997 A1 | 2/2009 |

* cited by examiner

*Primary Examiner* — Larry Thrower
(74) *Attorney, Agent, or Firm* — Fulbright & Jaworski LLP

(57) ABSTRACT

The invention relates to a method of drying an extruded material that includes the steps of: providing a gaseous atmosphere with superheated steam in a housing, extruding a material in the housing, drying the material in the gaseous atmosphere, and moving the dried material out of the housing. An apparatus for drying the extruded material is also provided.

14 Claims, 4 Drawing Sheets

METHOD AND APPARATUS FOR DRYING AN EXTRUDED MATERIAL

CROSS-REFERENCE TO RELATED APPLICATIONS

This application is a national phase filing of PCT/EP2008/006429 filed Aug. 5, 2008, claiming priority from Application DE 102007037607.5 filed on Aug. 7, 2007.

TECHNICAL FIELD

The invention relates to a method and an apparatus for drying an extruded material.

BACKGROUND OF THE INVENTION

In order for the extrusion process to be performed effectively, extruded materials often need to include a not inconsiderable water content, so that, after emerging from the extruder, they in many cases first have to be dried before being packed or used in some other way. Especially if the material is a food product, the drying process must as far as possible be performed in such a way that any contact between the material to be dried and germs or other micro-organisms can be ruled out. With conventional drying methods, in which there is contact between the material and dry air, it is, however, difficult to achieve general sterility.

The problem of the invention therefore consists in providing a method and an apparatus which make it possible to dry an extruded material efficiently without this entailing any contamination with undesirable germs.

BRIEF SUMMARY OF THE INVENTION

From the point of view of process engineering, this problem is solved by a method of drying an extruded material, comprising the steps of: providing a gaseous atmosphere with superheated steam in a housing, extruding a material in the housing, drying the material in the gaseous atmosphere, and moving the dried material out of the housing.

A particularly low level of germ content or even total sterility can be achieved if the temperature of the material when it emerges from the extruder or enters the housing is more than 100° C., especially more than 110° C., 120° C., 130° C. or 140° C.

It can be provided for the material to be dried to a water content of less than 50% by weight, 40% by weight, 30% by weight, 20% by weight or 10% by weight.

It can be provided for the material to be dried to a water content of less than 50% by weight, 40% by weight, 30% by weight, 20% by weight or 10% by weight. AW (Activity of Water) is defined as the quotient of water vapor pressure over the material (p) to the water vapor pressure over pure water ($p_0$) at a defined temperature: $AW=p/p_0$.

It can be provided for the gaseous atmosphere to be at a temperature of more than 100° C., 120° C., 140° C., 160° C., 180° C. or 220° C.

The gaseous atmosphere may be at ambient pressure or at an elevated or reduced pressure.

It is preferably provided that the gaseous atmosphere is a mixture of a first component, consisting of air and/or another gas, such as $CO_2$, nitrogen or another inert gas, and water vapor as a second component, and has a steam content of at least 50% by weight, 60% by weight, 70% by weight, 80% by weight, 90% by weight, 95% by weight, 98% by weight or 99% by weight. The gaseous atmosphere may also consist of pure water vapor.

In a convenient variant, it is provided that volatile substances which escape from the material into the gaseous atmosphere, especially flavors, are extracted from the gaseous atmosphere. After extraction, the substances can be added to the material again, either directly or in the form of a carrier material, e.g. a coating or filling, to which the extracted substances are first of all added.

The material can be packed after being moved out of the housing. In this context, it can be provided that substances extracted from the gaseous atmosphere are introduced into a packing container during the packing process.

From the apparatus point of view, the problem of the invention is solved by an apparatus for drying an extruded material, comprising a housing for holding a gaseous atmosphere with superheated steam, the housing having an inlet port and an outlet port, a means for generating a gaseous atmosphere with superheated steam inside the housing, an extruder connected to the inlet port, a transport means for receiving material from the extruder and moving the material through the outlet port out of the housing.

It is appropriate for the outlet port to be placed lower down than the inlet port.

The outlet port can be disposed at a free end of an outlet duct. The outlet duct can extend downwards from the housing.

It can be provided that a ventilation line communicates with the housing and has an exit aperture at a height below the housing and above the outlet port and leading to the outside.

Alternatively or in addition, it is possible for an extraction line to communicate with the housing and to be conducted via a fan to a condenser.

The transport means may have a perforated conveyor belt.

A conduit subjected to elevated or reduced pressure can be disposed along a part-section of the transport means, communicating with the housing, especially with the lower portion thereof.

A flow guide or sealing means may be disposed between the conduit and the partial section of the transport means in order to ensure that there is an intensive flow round or through the transport means through the gaseous atmosphere.

The apparatus is preferably equipped with an extraction unit for extracting volatile substances from the gaseous atmosphere.

It is also contemplated that there may be a packing station associated with the apparatus for packing the dried material.

It is convenient for the transport means to extend as far as the packing station.

BRIEF DESCRIPTION OF THE DRAWINGS

Further advantages and features of the invention will become clear from the following description of a preferred embodiment, reference being made to a drawing in which.

DETAILED DESCRIPTION OF THE INVENTION

Figure 1:
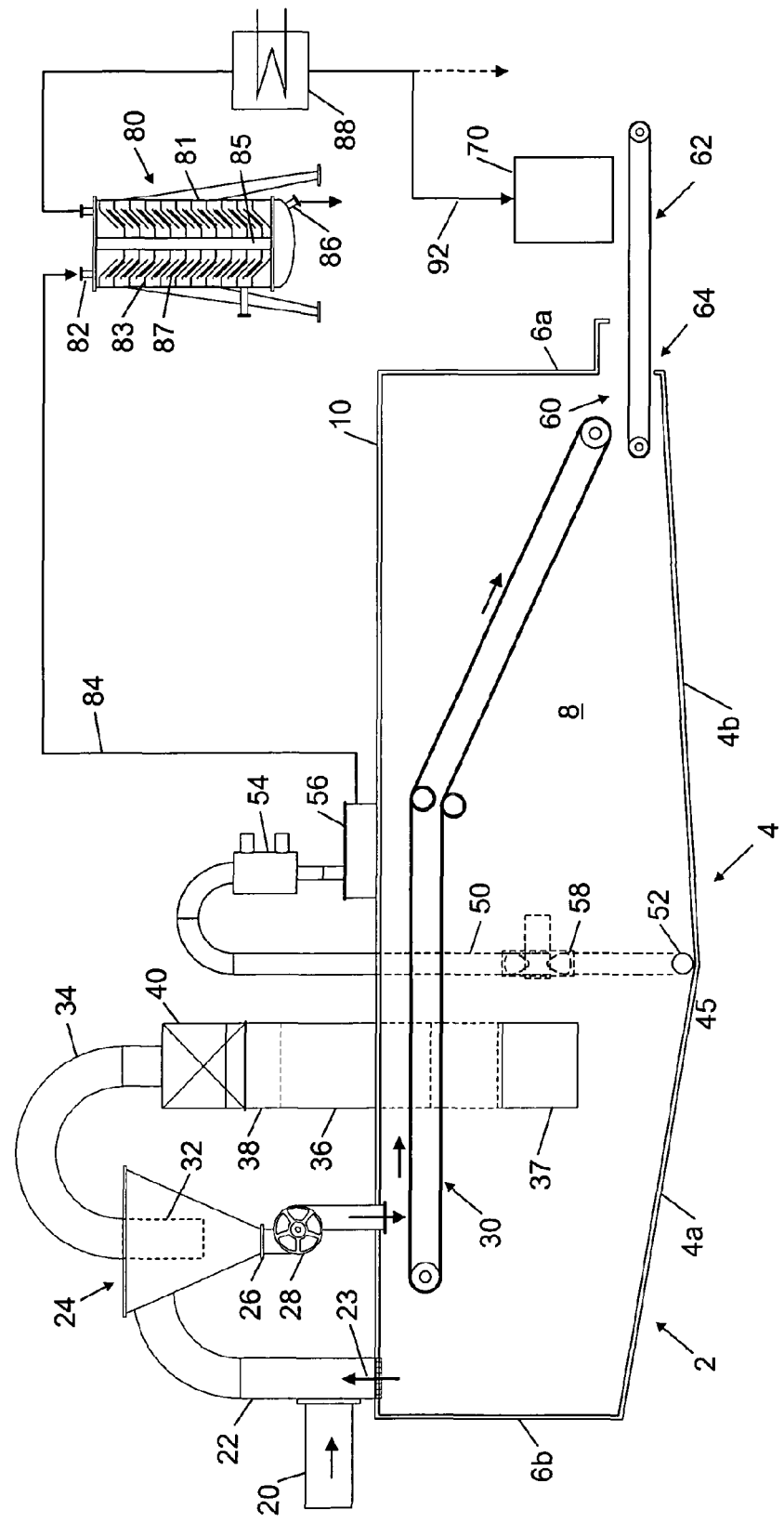
FIG. 1 shows a schematic side view of an apparatus in accordance with the invention, with which the method of the invention can be carried out.

The apparatus consists first of a housing 2 with a bottom wall 4, a right-hand side wall 6*a*, a left-hand side wall 6*b*, a rear wall 8, a corresponding front wall, not shown, and an upper wall 10. The bottom wall 4 is arranged substantially horizontally and consists, in the embodiment shown, of two bottom wall parts 4a, 4b inclined towards one another in a slight V shape. The purpose of this arrangement is to allow condensate to flow to a connecting or transition area between the two bottom wall parts 4a, 4b, which forms the lowest point of the interior space of the housing.

The front wall, not shown, is substantially parallel to the rear wall 8 and abuts the lateral edges of the upper wall, the side walls and the bottom wall in such a manner as to create a seal, so that, apart from the apertures, which will be explained below, the housing 2 surrounds an interior space which is enclosed on all sides.

An extruder 20, which is preferably a boiling extruder in which a temperature of at least 100° C. prevails, has an outlet port leading into a transport duct 22, which is connected to a centrifugal cyclone separator 24. An outlet port 26 from the centrifugal cyclone separator is connected to an inlet to a cellular wheel sluice 28, the outlet form which is guided through the upper wall 10 of the housing 2 and terminates over a transport means 30.

A submerged tube 32 of the centrifugal cyclone separator 24 is connected to a suction pipe 34, which is joined to a conduit 36. Inside the conduit, there is a fan 38 and a heating means in the form of a heat exchanger 40. At a certain height above the bottom wall 4, beneath the upper wall 10, the conduit 36 leads into an opening 37 in the rear wall 8, where the medium drawn in is returned into the housing.

Figure 2:
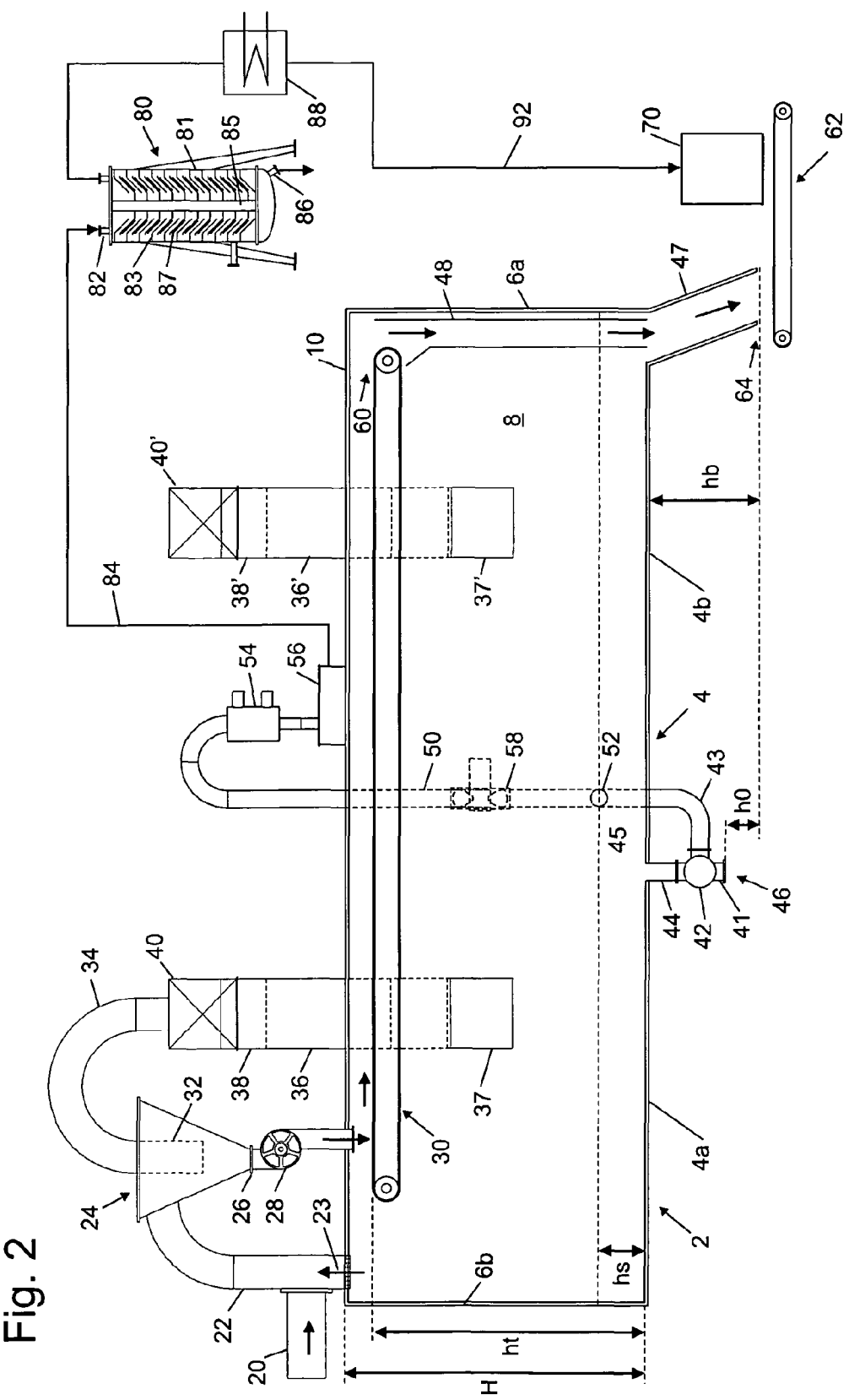
FIG. 2 shows a side view of a variant of the apparatus according to FIG. 1.

In order to intensify the contact between the medium to be dried and the superheated steam inside the upper portion of the interior of the housing, a further conduit 36 can be provided, as is indicated in FIG. 2 by way of example. In its course, the conduit likewise has a fan 38 and optionally a heating means 40. The conduit 36 leads firstly into the upper wall of the housing 10 in a region above the transport means 30 and secondly into an opening 37' in the rear wall 8. With such an arrangement, it is possible to extract hot, superheated steam from the region above the transport means 30, so that the steam flowing in flows intensively round the material located there. In a different embodiment, it could be provided that the opening 37' is located on the level of the transport means 30 and that the flow is in the opposite direction, so that hot steam is drawn in through the opening 37' and blown out through the opening in the upper wall 10 onto the transport means 30 from above, in order to bring the product located on it into intensive contact with the steam. As a further alternative, fans are possible, which are mounted above the transport means 30, and apply superheated steam intensively to the product to be dried.

In a lower portion of the housing, preferably in the region of a lowest point of the housing directly above the bottom wall 4, an extraction line 50 leads into an extraction port 52 in the rear wall 8 and leads to a condenser 54, from where condensate is directed into a container 56. Inside the extraction line 50, there is a controlled fan 58, which is controlled by temperature and/or moisture or steam content information. For this purpose, at least one temperature sensor and at least one steam content sensor are disposed inside the housing to determine the condition of the steam (relative humidity and/or degree of saturation, or steam content). It is advantageous to have one temperature sensor and one moisture or steam content sensor each in the upper region of the housing near the upper wall 10 and in the lower region near the bottom wall 14 or in the vicinity of the extraction port 52. If there is any superheated steam present, it is possible in this way to determine the degree of superheating or the temperature difference relative to the saturation state. By means of an enhanced extraction of relatively moist steam from the lower region of the housing, while at the same time supplying heat, the gaseous atmosphere inside the housing can be shifted in the direction of a higher content of superheated steam at a higher temperature.

In the example illustrated, the transport means 30 takes the form of a conveyor belt with a perforated transport belt, which first extends horizontally and then at a downward slope. Beneath one discharge end 60 of the transport means, there is a further transport belt 62, which runs horizontally through an outlet port 64 of the housing 2 to the outside.

A packing station 70 can be provided in the region of the further transport means 62, where the dried material is packed into individual packing containers, such as tins, screw-topped jars, containers with screw-on lids or vacuum press-on lids, or film bags.

An extraction unit 80 for recovering volatile substances, such as flavors, preferably takes the form of a spinning cone column or spinning table column. This is a vertical cylinder 81, in which an inert separating gas such as steam at normal or reduced pressure separates a vaporous stream of volatile components from a fluid input or a slurry. From top to bottom, there is an alternating arrangement of fixed conical sheets of metal 83 attached to the interior wall of the cylinder, and conical sheets of metal 87 attached to a rotating shaft 85.

The fluid input to be extracted, in this case the condensate forming in the housing 2, is introduced into a product input 82 at the top of the column via an extraction line 84. Under the force of gravity, the liquid flows down on the upper surface of the first fixed cone 83 and reaches the inside of the first rotating cone 87, on which the liquid is distributed into a thin, turbulent film because of the centrifugal forces acting on it, and then flows upwards and outwards and passes from the outer edge of the rotating cone onto the next-lower stationary cone until, having passed through all the cones, it reaches an outlet 86 at the foot of the column, where there is only a small content of volatile substances left in it.

The inert separating gas, steam in this case, which is fed in counterflow, flows through the column from bottom to top and absorbs volatile components. When the steam enriched with volatile substances reaches the head of the column, it is condensed in a condenser 88, so that the volatile substances are available in a concentrated form, dissolved in water, and can be delivered in the manner described to the dried material and/or a packing container.

The method of the invention provides that the material to be dried in the housing 2 is first extruded in the extruder 20, a temperature of more than 100° C. being appropriate in the process, with a view to ensuring that the material is already largely or completely free of germs when it emerges from the extruder. After emerging from the extruder, the material enters the transport duct 22 directly, without the possibility of any contamination occurring, and is immediately entrained in the direction of flow 23 by the current prevailing in the transport duct 22 and reaches the centrifugal cyclone separator 24. A mixture of gas/steam which is virtually free of particles flows into the conduit 36 via the suction pipe 34, while the separated material passes through the cellular wheel sluice 28 and reaches the transport means 30.

In order to generate the desired gaseous atmosphere with superheated steam or an atmosphere of pure superheated steam inside the housing 2, such as is described in U.S. Pat. No. 5,711,086, there is a heating means 40 inside the conduit 36, which can take the form of an electric heating element, heat exchanger, condenser or the like. The gas/steam atmosphere conducted in a closed circuit via the transport duct 22, the centrifugal cyclone separator 24, the suction pipe 34, the conduit 36 and the housing 2 can be heated to a desired temperature in this way. The material entering the housing 2 via the extruder causes an input of water or steam in the housing, so that the steam content inside the housing increases. By means of an appropriate open or closed-loop control of the steam extracted via the extraction line 50 and condensed in the condenser 54, the steam content in the housing 2 can be adjusted. If there is no extraction, surplus steam is released to the outside through the outlet port 64. The housing can be equipped with an outlet duct extending downwards and a ventilation line, as is illustrated in FIG. 2.

In order to accelerate or intensify the generation of the desired gaseous atmosphere, a steam feed line, not shown, can be used to introduce superheated steam directly into the housing 2. Alternatively, it can be provided that a steam or water feed line, such as a water atomizer, leads into the conduit 36 upstream of the heating means 40, so that by heating the steam or evaporating the water, a superheated steam atmosphere can be introduced in the region of the opening 37.

Figure 4:
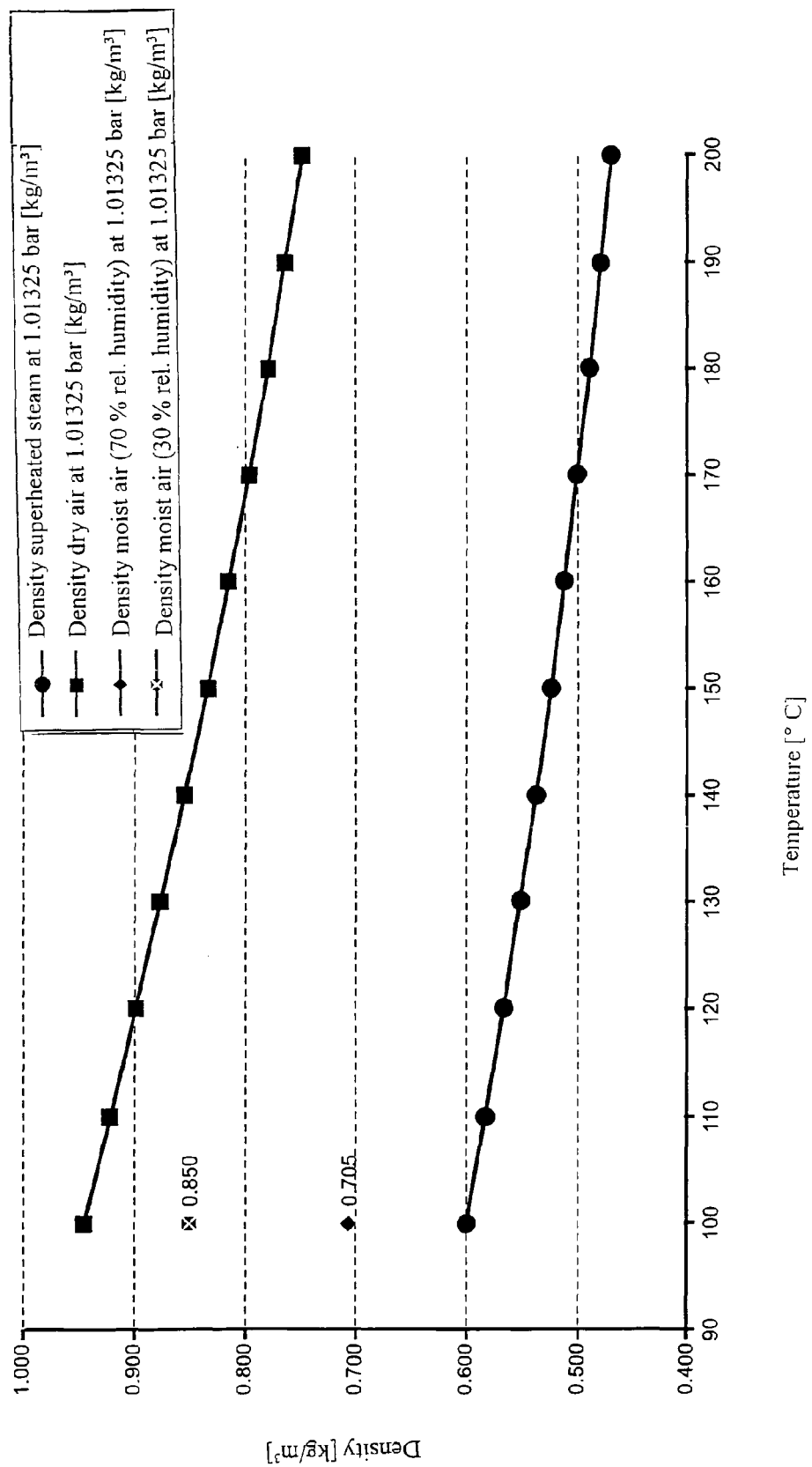
FIG. 4 shows density values of steam and dry and moist air at different temperatures and relative humidity values (rh).

Because of the different densities of steam at different temperatures and because of the influence of any air that might be mixed in, as is shown in FIG. 4, vertical layers form inside the housing, with superheated steam collecting at the top and moister steam and/or a steam-air mixture collecting at the bottom. For this reason, after the material to be dried has been delivered, the transport means 30 first runs in a first section in an upper region of the housing near the upper wall 10, i.e. inside a zone of superheated steam, after which the material is then conveyed towards the outlet port 64 lower down. The low position of the outlet port 64 makes it difficult for superheated steam to escape directly from the housing, which would be an undesirable loss. Alternatively, the conveyor belt 30 could run completely horizontally, as is shown in FIG. 2.

FIG. 2 illustrates a variant of the apparatus according to FIG. 1, in which first of all saturated steam and thus the surplus moisture can be conducted out of the housing by extraction via the extraction port 52 or alternatively via a ventilation line 41. The ventilation line 41 is connected to a three-way valve 42, which is also connected, via a connection line 43, to the extraction line 50 and, via a further connection line 44, to an opening 45 in the bottom wall 4. The ventilation line has a ventilation aperture 46 leading to the outside The three-way valve 42 can be placed in a first position, in which the lines 43 and 44 communicate, while the line 41 is sealed off, so that extraction takes place via the ports 45 and 52. If desired, a check valve may be provided in the line 43 in order to be able to ensure that in the first position of the three-way valve, extraction occurs exclusively via the port 52.

The three-way valve 42 can be placed in a second position, in which the vent line 44 communicates with the conduit 44, while the conduit 43 is sealed off and the fan 58 is switched off, so that the steam atmosphere within the housing communicates with the environment via the port 45 and the conduits 44 and 41.

In contrast to the apparatus according to FIG. 1, the apparatus illustrated in FIG. 2 includes a guide duct 47, which, in the region of the outlet port 64, extends the housing downwards and terminates openly. A chute 48 conducts the material from the discharge end 60 of the transport means 30 onto the further transport belt 62. Together with the ventilation line 41, which terminates on a higher level, the guide duct ensures that surplus steam is released from the interior of the housing 2 via the ventilation line 41, in the second position of the three-way valve 42. The steam located inside the housing has a tendency to flow downwards through the guide duct, but encounters relatively cold ambient air in the process, so that a substantially horizontal boundary layer forms in the guide duct at the level of the ventilation aperture 46. The height h0 at which the vent aperture 46 is located above the height of the free end of the guide channels may, for example, 10%, 20%, 30% or 50% of the height H of the housing, H indicating the vertical distance between the highest and lowest points of the interior of the housing. In addition, the height h0 is preferably between about 30% and 70%, e.g. 50%, of the vertical extent hb of the guide duct, beginning at the lower wall 4 or the lowest point of the housing.

In all embodiments, a height hs of the extraction port 52 above the lower wall 4 of the housing or the lowest point of the housing may be virtually zero in effect, or it may be about 5%, 10%, 15%, 20% or 30% of H. A height ht at which the actual drying process mainly takes place and at which or above which the horizontal partial layer is preferably located, in which the gaseous atmosphere is of the desired high temperature and exhibits low oxygen values, may be about 50%, 60%, 70%, 80%, 90% or 95% of the height H of the housing, measured in each case from the lower wall of the housing 4 or the lowest point of the housing.

Figure 3:
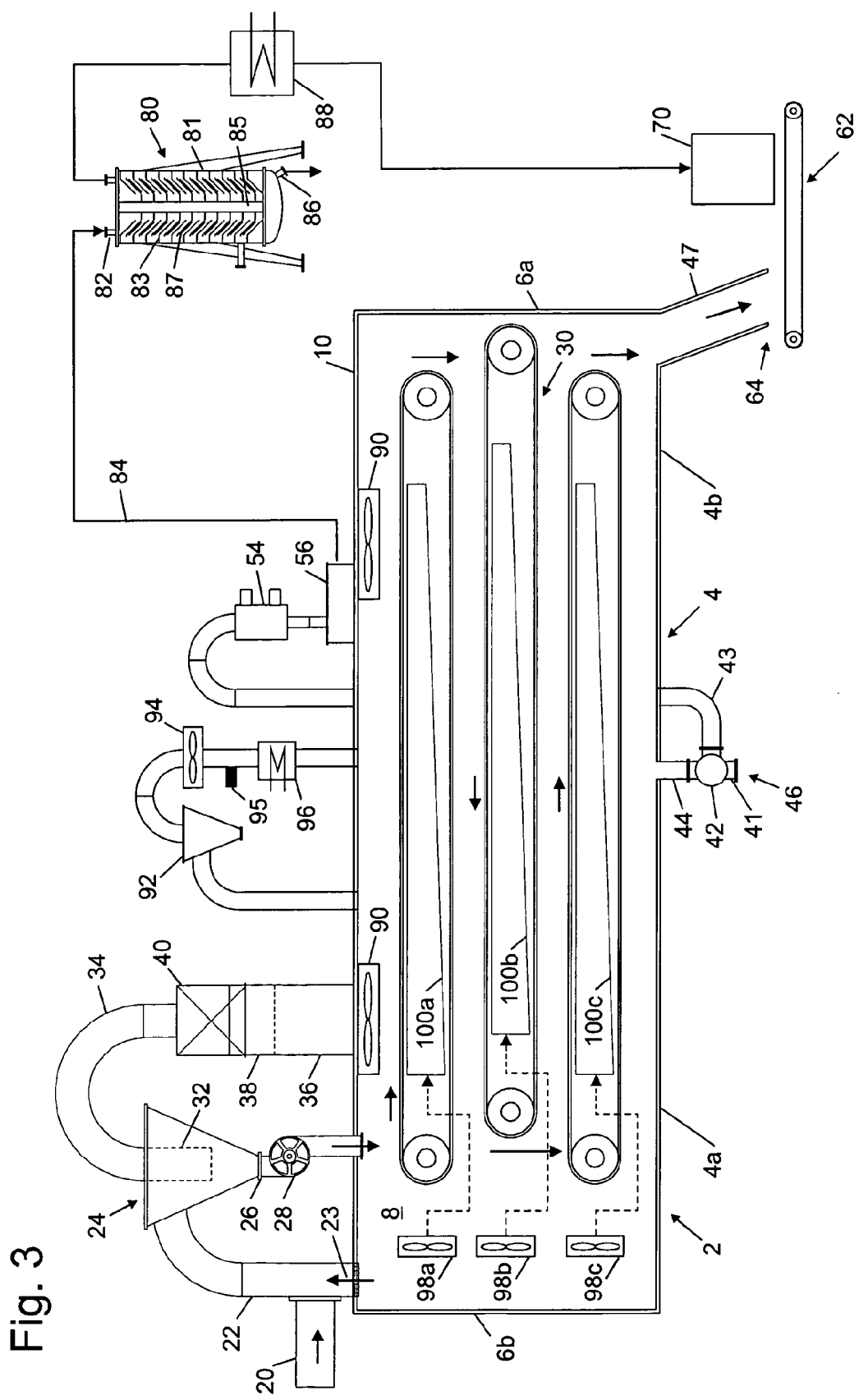
FIG. 3 shows a variant of the apparatus according to FIG. 1.

FIG. 3 illustrates a variant of the invention in which—unlike the embodiments illustrated in FIGS. 1 and 2—the aim is not to have a distinct horizontal succession of layers with a steam atmosphere that, moving from bottom to top, becomes increasingly warmer, poorer in air and oxygen and increasingly contains only superheated steam, but rather a steam atmosphere which is mixed as thoroughly as possible and homogenized within the entire housing. This is achieved in that the interior of the housing is evenly mixed with the aid of at least one circulation fan 90 (FIG. 3 shows two of them), so that virtually no stratification or uneven mixing can become established in the vertical direction.

In addition, the contact between the material to be dried and the steam atmosphere is improved with a forced circulation system consisting of a cyclone 92, a fan 94, a heat exchanger 96, fans 98a, b, c and, connected to them, steam guide boxes 100a, b, c. Depending on what is more appropriate, the cyclone 92, fan 94, heat exchanger 96 and fans 98 may be disposed inside or outside the housing 2. Depending on the flow conditions, either the fan 94 or the fans 98 may be dispensed with. The fan 94 sucks in the steam atmosphere across the cyclone 92 upstream, in which particles originating from the material to be dried are deposited. The cyclone for its part sucks in the steam atmosphere at any suitable point or area within the housing. Downstream of the fan 94, the steam atmosphere flows through the heat exchanger 96, having optionally been enriched with steam beforehand by means of a steam generator 95. In the heat exchanger 96, heat may be supplied or removed as required, whereupon the steam atmosphere then enters the steam guide boxes 100a, b, c via the fans 98a, b, c. The steam guide boxes guide the steam atmosphere through a preferably perforated conveyor belt of the transport means 30, so that the material on it is brought into intimate contact with the steam atmosphere.

LIST OF REFERENCES

2 Housing
4 Bottom wall
4a, b Bottom wall part
6a, b Right-hand, left-hand side wall
8 Rear wall
10 Upper wall
20 Extruder 22 Transport duct
23 Direction of flow
24 Centrifugal cyclone separator
26 Outlet port
28 Cellular wheel sluice
30 Transport means
32 Submerged tube
34 Suction pipe
36, 36 Conduit
37', 37' Opening
38, 38' Fan
40, 40' Heat exchanger
41 Ventilation line
42 Three-way valve
43, 44 Connection line
45 Opening
46 Ventilation aperture
47 Guide duct
48 Chute
50 Extraction line
52 Extraction port
54 Condenser
56 Container
60 Discharge end (of 30)
62 Further transport belt
64 Outlet port
70 Packing station
80 Extraction unit
81 Cylinder
82 Product input
83 Fixed cone
84 Extraction line
85 Rotating shaft
86 Outlet
87 Rotating cone
88 Condenser
90 Circulation fan
92 Cyclone
94 Fan
95 Steam generator
96 Heat exchanger
98a, b, c Fan
100a, b, c Steam guide box

What is claimed is:

1. A method of drying an extruded food material in an enclosed apparatus, comprising the steps of:
   providing a gaseous atmosphere with superheated steam in an enclosed housing, the gaseous atmosphere in the housing being at a temperature of at least 100° C.;
   extruding a food material in an extruder having a temperature of at least 100° C.;
   extruding the food material into a transport duct branching off the housing;
   transporting the food material into a cyclone separator by means of a flow of gas and steam created in the transport duct;
   separating the food material in the cyclone separator from the gas and steam flow of the transport duct and conveying the food material into the housing;
   drying the food material in the housing in the gaseous atmosphere with superheated steam; and
   moving the dried food material out of the enclosed housing;
   wherein the food material emerges from the extruder at a temperature more of that 100° C. which prevents the contamination of the food material during the drying steps.

2. The method as claimed in claim 1, wherein the temperature of the material when it enters the housing is selected from the group consisting of more than 100° C., 110° C., 120° C., 130° C. or 140° C.

3. The method as claimed in either of claim 1, wherein the material is dried to a water content selected from a group of less than 50% by weight, less than 40% by weight, less than 30% by weight, less than 20% by weight and less than 10% by weight.

4. The method as claimed in claim 1, wherein the material is dried to an $a_w$ value selected from the group consisting of less than 0.6, less than 0.5, less than 0.4, less than 0.3, less than 0.2 and less than 0.1.

5. The method as claimed in claim 1, wherein the gaseous atmosphere is at a temperature selected from the group of more than 100° C., more than 120° C., more than 140° C., more than 160° C., more than 180° C. and more than 220° C.

6. The method as claimed in claim 1, wherein the gaseous atmosphere is at ambient pressure, at an elevated or at a reduced pressure.

7. The method as claimed in claim 1, wherein the gaseous atmosphere is a mixture of a first component, consisting of air and/or $CO_2$, nitrogen or another inert gas, and water vapor as a second component, and has a steam content selected from the group consisting of at least 50% by weight, at least 60% by weight, at least 70% by weight, at least 80% by weight, at least 90% by weight, at least 95% by weight, at least 98% by weight and at least 99% by weight.

8. The method as claimed in claim 1, wherein volatile substances which escape from the material into the gaseous atmosphere are extracted from the gaseous atmosphere.

9. The method as claimed in claim 8, wherein, after extraction, the substances are added to the material again.

10. The method as claimed in claim 9, wherein the substances are added to the material directly or in the form of a carrier material.

11. The method as claimed in claim 1, wherein the material is packed after being moved out of the housing.

12. The method as claimed in claim 11, wherein substances extracted from the gaseous atmosphere are introduced into a packing container during the packing process.

13. The method as claimed in claim 1, wherein the gaseous atmosphere inside the housing is thoroughly mixed and vertical stratification is avoided.

14. The method as claimed in claim 10, wherein the carrier material is a coating or a filling.

* * * * *